US011197163B2

(12) United States Patent
Horn et al.

(10) Patent No.: US 11,197,163 B2
(45) Date of Patent: *Dec. 7, 2021

(54) METHOD AND APPARATUS FOR TIMESLOT SWAPPING

(71) Applicant: QUALCOMM Incorporated, San Diego, CA (US)

(72) Inventors: Gavin Bernard Horn, La Jolla, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,878

(22) Filed: Oct. 20, 2017

(65) Prior Publication Data

US 2018/0063719 A1 Mar. 1, 2018

Related U.S. Application Data

(63) Continuation of application No. 12/063,657, filed as application No. PCT/US2007/085362 on Nov. 21, 2007, now Pat. No. 9,820,156.

(51) Int. Cl.
*H04W 16/10* (2009.01)
*H04W 16/04* (2009.01)
(Continued)

(52) U.S. Cl.
CPC .......... *H04W 16/10* (2013.01); *H04W 16/04* (2013.01); *H04W 16/02* (2013.01); *H04W 28/0231* (2013.01)

(58) Field of Classification Search
None
See application file for complete search history.

(56) References Cited

U.S. PATENT DOCUMENTS 4,785,450 A 11/1988 Bolgiano et al.
5,383,225 A * 1/1995 Aguirre ............... H04B 7/2125
370/337

(Continued)

FOREIGN PATENT DOCUMENTS

CN 1296364 A 5/2001
CN 1722643 A 1/2006
(Continued)

OTHER PUBLICATIONS

ISA/EP, International Search Report of the International Searching Authority, Int'l Application No. PCT/US07/085362, Sep. 19, 2008, European Patent Office, Rijswijk, NL, 3 pgs.

(Continued)

*Primary Examiner* — Christopher T Wyllie
(74) *Attorney, Agent, or Firm* — Holland & Hart LLP

(57) ABSTRACT

All or a portion of a timeslot of a slotted communication system may be dynamically designated for transmitting or for receiving. For example, a timeslot originally designated for receiving information at a wireless node may be temporarily designated for transmitting information from the wireless node. Such a designation may be made to accommodate a temporary asymmetry in traffic flow between wireless nodes or may be made based on other criteria. In some aspects, a resource utilization messaging scheme may be employed to mitigate interference associated with the designation of timeslots for transmitting or receiving.

20 Claims, 12 Drawing Sheets

(51) Int. Cl.
*H04W 28/02* (2009.01)
*H04W 16/02* (2009.01)

(56) References Cited

U.S. PATENT DOCUMENTS

| | | | | |
|---|---|---|---|---|
| 5,689,502 | A * | 11/1997 | Scott | H04J 3/0682 370/281 |
| 5,778,318 | A * | 7/1998 | Talarmo | H04W 72/082 370/341 |
| 5,920,557 | A * | 7/1999 | Hirata | H04J 3/0605 370/350 |
| 5,923,643 | A * | 7/1999 | Higgins | H04L 12/437 370/218 |
| 6,016,311 | A * | 1/2000 | Gilbert | H04B 7/2646 370/280 |
| 6,320,854 | B1 * | 11/2001 | Farber | H04W 72/082 370/328 |
| 6,327,256 | B1 | 12/2001 | Paivike et al. | |
| 6,813,261 | B1 | 11/2004 | Esmailzadeh et al. | |
| 6,842,438 | B1 | 1/2005 | Benedict et al. | |
| 6,925,068 | B1 * | 8/2005 | Stanwood | H04W 72/0406 370/329 |
| 6,930,993 | B1 * | 8/2005 | Hamada | H04W 16/04 370/337 |
| 7,280,562 | B2 | 10/2007 | Sindhushayana et al. | |
| 7,433,310 | B2 | 10/2008 | Marinier | |
| 7,620,021 | B1 | 11/2009 | Chen et al. | |
| 8,134,991 | B2 | 3/2012 | Yu | |
| 8,576,872 | B2 | 11/2013 | Agrawal et al. | |
| 8,942,161 | B2 | 1/2015 | Gupta et al. | |
| 9,820,156 | B2 * | 11/2017 | Horn | H04W 16/10 |
| 2001/0006552 | A1 | 7/2001 | Salokannel | |
| 2001/0016482 | A1 * | 8/2001 | Bergstrom | H04W 48/20 455/332 |
| 2001/0053142 | A1 * | 12/2001 | Abe | H04L 1/0041 370/337 |
| 2002/0093975 | A1 * | 7/2002 | Lin | H04J 3/16 370/442 |
| 2003/0017830 | A1 * | 1/2003 | Kayama | H04W 72/0446 455/450 |
| 2003/0091019 | A1 | 5/2003 | Takano | |
| 2003/0190892 | A1 * | 10/2003 | Shimada | H04W 72/082 455/63.1 |
| 2004/0047309 | A1 | 3/2004 | Barnes | |
| 2004/0057402 | A1 * | 3/2004 | Ramos | H04W 28/18 370/329 |
| 2004/0165547 | A1 * | 8/2004 | Lopes | H04B 7/2615 370/328 |
| 2004/0214582 | A1 * | 10/2004 | Lan | H04W 72/02 455/452.2 |
| 2005/0018697 | A1 | 1/2005 | Enns et al. | |
| 2006/0077912 | A1 * | 4/2006 | Cheng | H04B 7/2656 370/265 |
| 2006/0135145 | A1 * | 6/2006 | Redi | H04W 52/0216 455/420 |
| 2006/0245440 | A1 * | 11/2006 | Mizukoshi | H04W 16/14 370/400 |
| 2007/0060156 | A1 * | 3/2007 | Cave | H04W 24/02 455/450 |
| 2007/0105573 | A1 | 5/2007 | Gupta et al. | |
| 2008/0095163 | A1 * | 4/2008 | Chen | H04L 45/16 370/392 |
| 2009/0027170 | A1 * | 1/2009 | Amir | G01S 13/825 340/10.31 |
| 2009/0285121 | A1 * | 11/2009 | Tzannes | H04W 72/005 370/254 |
| 2013/0095836 | A1 * | 4/2013 | Carmon | H04W 52/0206 455/438 |

FOREIGN PATENT DOCUMENTS

| | | | |
|---|---|---|---|
| EP | 1098542 A2 | 5/2001 | |
| EP | 1122895 A1 * | 8/2001 | H04B 7/2643 |
| EP | 1098542 B1 | 10/2008 | |
| JP | 2000278324 A | 10/2000 | |
| JP | 2001136570 A | 5/2001 | |
| JP | 2001177865 A | 6/2001 | |
| JP | 2002044716 A | 2/2002 | |
| JP | 2003032734 A | 1/2003 | |
| JP | 2003152622 A | 5/2003 | |
| JP | 2004120237 A | 4/2004 | |
| JP | 2006121280 A | 5/2006 | |
| WO | WO-9926430 A1 | 5/1999 | |
| WO | WO-04075495 | 9/2004 | |
| WO | WO-05088922 | 9/2005 | |

OTHER PUBLICATIONS

Seong D.G, "EE526 Switching System Engineering", KAIST, 1999 Fall, Communication Networks Research Lab, 76 pgs.

TIPO, Supplementary Taiwan Search Report, TW App. No. TW097145257, dated Mar. 29, 2012, Taiwan Patent Office, 1 pg.

ISA/EP, Written Opinion of the International Searching Authority, Int'l Application No. PCT/US07/085362, Sep. 19, 2008, European Patent Office, Rijswijk, NL, 7 pgs.

\* cited by examiner

METHOD AND APPARATUS FOR TIMESLOT SWAPPING

CROSS REFERENCES

The present Application for Patent is a Continuation of U.S. patent application Ser. No. 12/063,657 by Horn et al. entitled "Method and Apparatus for Timeslot Swapping," filed Feb. 12, 2008, which is a national stage entry of International Patent Application No. PCT/US2007/085362 by Horn et al., entitled "Method and Apparatus for Timeslot Swapping," filed Nov. 21, 2007, assigned to the assignee hereof.

BACKGROUND

Field of the Disclosure

This application relates generally to wireless communication and more specifically, but not exclusively, to dynamically designating at least a portion of a timeslot for transmitting or receiving.

Description of Related Art

A wireless communication system may be deployed in various ways depending on the requirements of the intended application. For example, a planned deployment may be utilized for an application such as a cellular network where seamless connectivity is desired over a relatively wide area. To reduce interference in such a network, the channel or channels used by the wireless devices of the network may be defined throughout the network.

Moreover, to further control interference in such a network, the wireless devices of the network may use designated uplink and downlink timeslots to communicate whereby a given wireless device may only transmit data during specific timeslots and receive data during other specified timeslots. In such a network, the partitioning of uplink and downlink timeslots may be identical for all of the cells in the system so that transmissions by the wireless devices of one cell will not unduly interfere with reception at the wireless devices of a neighboring cell. Here, the specific partitioning between uplink and downlink timeslots may be statically defined for the entire network based on an expected average asymmetry of the flows between the devices in the entire system.

A more flexible deployment scheme may be used for an application such as a local area network (e.g., a Wi-Fi network) that supports various wireless devices having different communication capabilities. For example, in an unplanned network a set of wireless devices may not use a timeslot structure for transmitting and receiving data. Rather, a given wireless device may transmit data any time a selected channel is not being used by another wireless device. In such a system, an appropriate collision avoidance protocol may be employed to prevent neighboring wireless devices from unduly interfering with one another.

In practice, the above deployment schemes may have certain disadvantages due to tradeoffs that may be made to support the intended applications. For example, due to the relative complexity of centralized planning, setting up a planned wireless wide area network may be relatively expensive and time consuming. Moreover, such a scheme may not efficiently support asymmetric traffic, particularly when there is little or no multiplexing of traffic. Hence, such a scheme may not be well suited for "hot spot" deployments.

On the other hand, an unplanned wireless local area network may not achieve the same level of spatial efficiency (bits/unit area) as a planned network. In addition, collision avoidance techniques that may be used in unplanned networks may result in poor utilization, limited fairness control, and susceptibility to hidden and exposed nodes.

SUMMARY

A summary of sample aspects of the disclosure follows. It should be understood that any reference to the term aspects herein may refer to one or more aspects of the disclosure.

The disclosure relates in some aspects to designating how timeslots are used in a timeslot-based communication scheme. In particular, timeslot usage may be dynamically designated so that a given timeslot may be used for transmitting or for receiving. For example, initially a timeslot may be designated so that a particular wireless node transmits information during the timeslot. Then, at a later point in time, the timeslot may be designated so that the same wireless node receives information during the timeslot.

By dynamically designating how timeslots may be used, a system may more efficiently accommodate the traffic requirements of the wireless nodes in the system. For example, a decision to designate a new use for one or more timeslots may be based on a current asymmetry between the amount of information that is queued for transmission from a first wireless node to a second wireless node and the amount of information that is queued for transmission from the second wireless node to the first wireless node. Similarly, a decision to designate a new use for one or more timeslots may be based on a difference between the rate at which information may be transmitted from a first wireless node to a second wireless node and the rate at which information may be transmitted from the second wireless node to the first wireless node. Also, a decision to designate a new use for one or more timeslots may be based on the level of interference seen by a given wireless node.

In some aspects a portion of a timeslot may be designated for transmitting or for receiving. For example, a given timeslot may be defined with distinct portions whereby the use of one or more of the portions is dynamically designated. As a further example, a timeslot may be defined with several data portions and several control portions. In this case, the data portions may be dynamically designated for transmitting or receiving depending on the particular traffic requirements in the system at that time. In some cases, the use of the control portions may not be changed to ensure that the wireless nodes may continue to transmit and monitor for control information at the designated times. In contrast, in other cases a control portion of a timeslot may be used for transmitting control information under some conditions while under other conditions that same control portion may be used for receiving control information.

In some aspects interference mitigation techniques may be employed in conjunction with dynamic designation of timeslot usage. For example, a resource utilization message-based scheme may be employed to mitigate interference that is caused between neighboring wireless nodes as a result of a designation of timeslot usage. In addition, such a message scheme may be used to determine whether to designate a particular use of one or more timeslots.

BRIEF DESCRIPTION OF THE DRAWINGS

These and other sample aspects of the disclosure will be described in the detailed description and the appended claims that follow, and in the accompanying drawings, wherein:

FIG. 4, including

Figure 1:
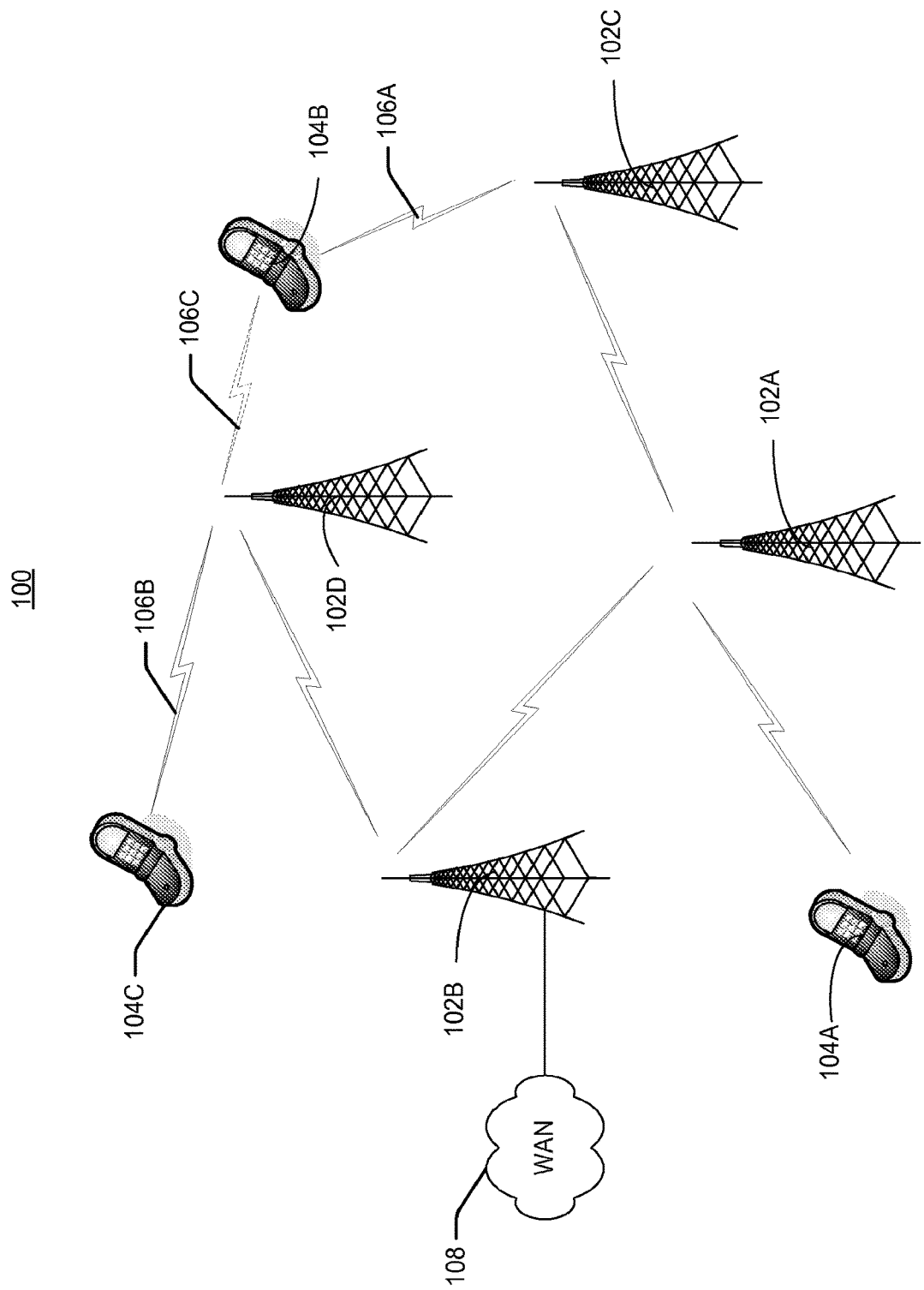
FIG. 1 is a simplified diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects the designation of a use for at least one portion of a timeslot comprises designating a portion of the timeslot for transmitting to a given node or for receiving from that node. In addition, in some aspects the designation of use is a function of the amount of traffic to be transmitted between that node and another node.

FIG. 1 illustrates several sample aspects of a wireless communication system 100. The system 100 includes several wireless nodes, generally designated as nodes 102 and 104. A given node may receive and/or transmit one or more traffic flows. For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, a node may comprise an access terminal, a relay point, an access point, or some other component. Referring to FIG. 1, the nodes 102 may comprise access points or relay points and the nodes 104 may comprise access terminals. The nodes 102 may facilitate communication between the nodes of a network (e.g., a Wi-Fi network, a cellular network, or a WiMax network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the nodes (e.g., node 102B) may comprise a wired access point that provides connectivity to another network or networks (e.g., a wide area network 108 such as the Internet).

In some aspects two or more nodes of the system 100 (e.g., nodes of a common independent service set) associate with one another to establish traffic flows (e.g., links) between the nodes. For example, the nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some aspects, traffic flows between nodes may be established using a slotted communication scheme. For example, communication between nodes in the system 100 may be accomplished through the use of designated timeslots. In some aspects, the teachings herein may relate to synchronous slotted communication where all of the nodes in a system utilize a common slotted structure. In addition, in some aspects the teachings herein may be applicable to asynchronous slotted communication where the timeslots of unassociated nodes in a system may not be synchronized. These teachings also may be applicable to other forms of communication.

Figure 2:
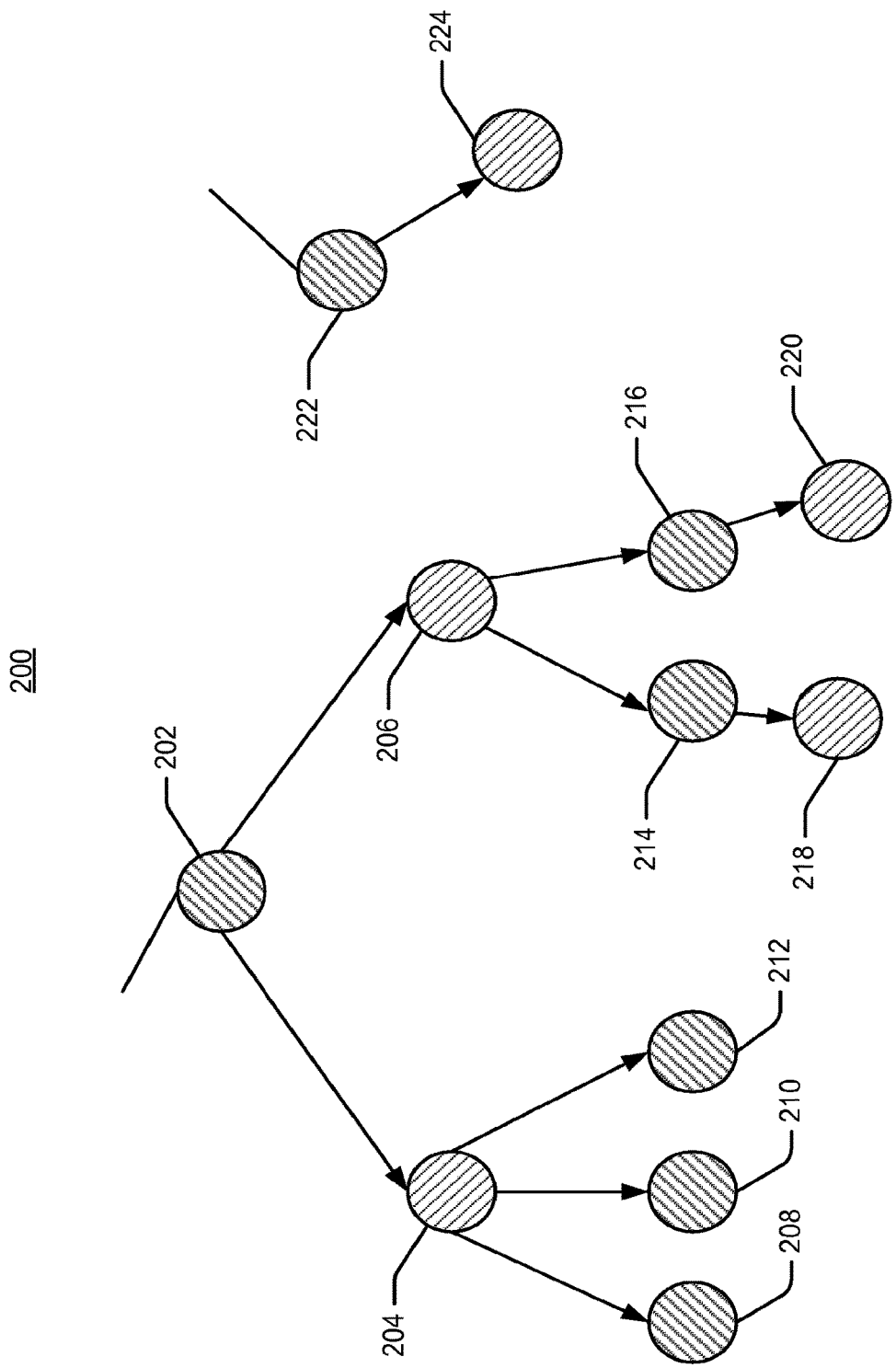
FIG. 2 is a simplified diagram of several sample aspects of a network of wireless nodes.

FIG. 2 illustrates a simplified example of timeslot-based traffic flow for two groups of nodes (e.g., two cells) in a system 200. For illustration purposes this example only shows one direction of traffic flow as represented by the arrowed lines. In the first group, traffic flowing to a first node 202 (e.g., an access point) is distributed to neighboring nodes 204 and 206. The nodes 204 and 206 then distribute the traffic to nodes in their respective vicinities (nodes 208-212 and nodes 214-216, respectively). This distribution scheme may be continued throughout the group to enable all of the nodes in the group to receive traffic from at least one other node.

FIG. 2 also illustrates two nodes 222 and 224 of a second group that are relatively close to the nodes 206 and 216 of the first group. Again, only one direction of traffic flow is shown between the nodes.

As represented by the shading in FIG. 2, each node in the system 200 is allowed to transmit or to receive during certain timeslots. The left-hand side of FIG. 3 graphically illustrates an example of timeslot designations. For example, a first set of nodes (e.g., nodes 202, 208, 210, 212, 214, 216, and 222) may initially be configured to transmit during odd numbered timeslots (e.g., timeslots 306 and 308 in the set of timeslots 302) and while a second set of nodes (e.g., nodes 204, 206, 218, 220, and 224) may initially be configured to transmit during even numbered timeslots (e.g., timeslots 310 and 312 in the set of timeslots 304). In this case, the first set of nodes receives during even numbered timeslots and the second set of nodes receives during odd numbered timeslots. As illustrated by the relative alignment of the timeslots of FIG. 3, the timeslots for all of the nodes in the system 200 are synchronized.

The example of FIG. 2 depicts an alternating timeslot scheme whereby different timeslots are assigned to each successive level in the hierarchical tree. Such an alternating timeslot scheme may enable more efficient multiplexing of data flows in multi-hop configurations. It should be appreciated, however, that other examples may employ different timeslot allocation "patterns."

Through the use of a timeslot scheme as described above, a wireless system may achieve increased spectral efficiency and reduced interference. For example, nodes in the system may be assigned certain timeslots depending upon the nodes' relative proximity to other nodes in the system. Here, if the nodes that transmit during the same timeslot are spaced a sufficient distance apart, the nodes may be able to successfully transmit to their receiving nodes without causing undue interference at other receiving nodes. As a specific example, in FIG. 2 transmission by node 202 may not unduly interfere with reception at nodes 208-216 since these nodes are not receiving when node 202 is transmitting. Thus, in contrast with an unplanned scheme, the nodes of the system 200 may be able to transmit more frequently and at higher power levels.

If the timeslot assignments of FIG. 2 are defined in a static manner, the system 200 may have several drawbacks. For example, only nodes having opposite timeslot assignments may communicate in such a case. Consequently, such a scheme may not be effective for an arbitrary mesh network.

Moreover, a static scheme may not adapt to dynamic changes relating to the asymmetry of data flows in the system. Instead, the ratio of the number or duration of the different timeslots in a static scheme may simply be designed to match an average asymmetry of traffic in the system. Consequently, in systems where there is little or no multiplexing of traffic, an unacceptable number of the timeslots of such a static system may not be used if there is a change in the asymmetry of the traffic flows in the system or if the current traffic flows do not match the average asymmetry.

Figure 3:
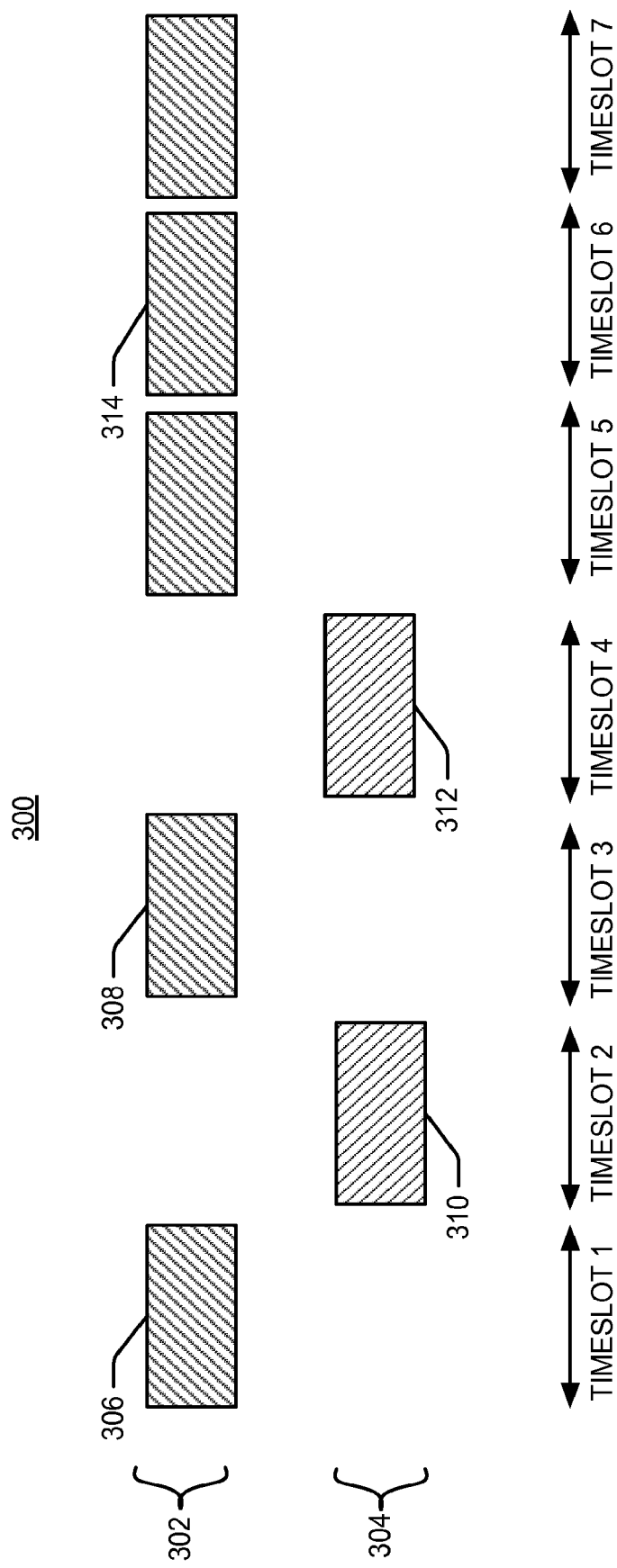
FIG. 3 is a simplified diagram of several sample aspects of designation of timeslot usage.

The right hand side of FIG. 3 illustrates, in a simplified manner, a timeslot swapping scheme that may be employed to more effectively accommodate traffic in a system. Here, a timeslot 314 that may have originally been designated as a receive timeslot for a given node may be designated as a transmit timeslot for that node. That is, the timeslot 314 may have originally been associated with the set of timeslots 304. Through the use of such a timeslot swapping scheme, the system may be able to accommodate dynamic changes in asymmetry of traffic flows between nodes. For example, in the event a node such as an access point determines it has more data waiting to be sent to an associated node (e.g., an access terminal) than the associated node has waiting to be sent to the access point, the access point may temporarily designate several of its receive timeslots as transmit timeslots (conversely, corresponding transmit timeslots of the associated node are redesignated as receive timeslots).

Figure 4A:
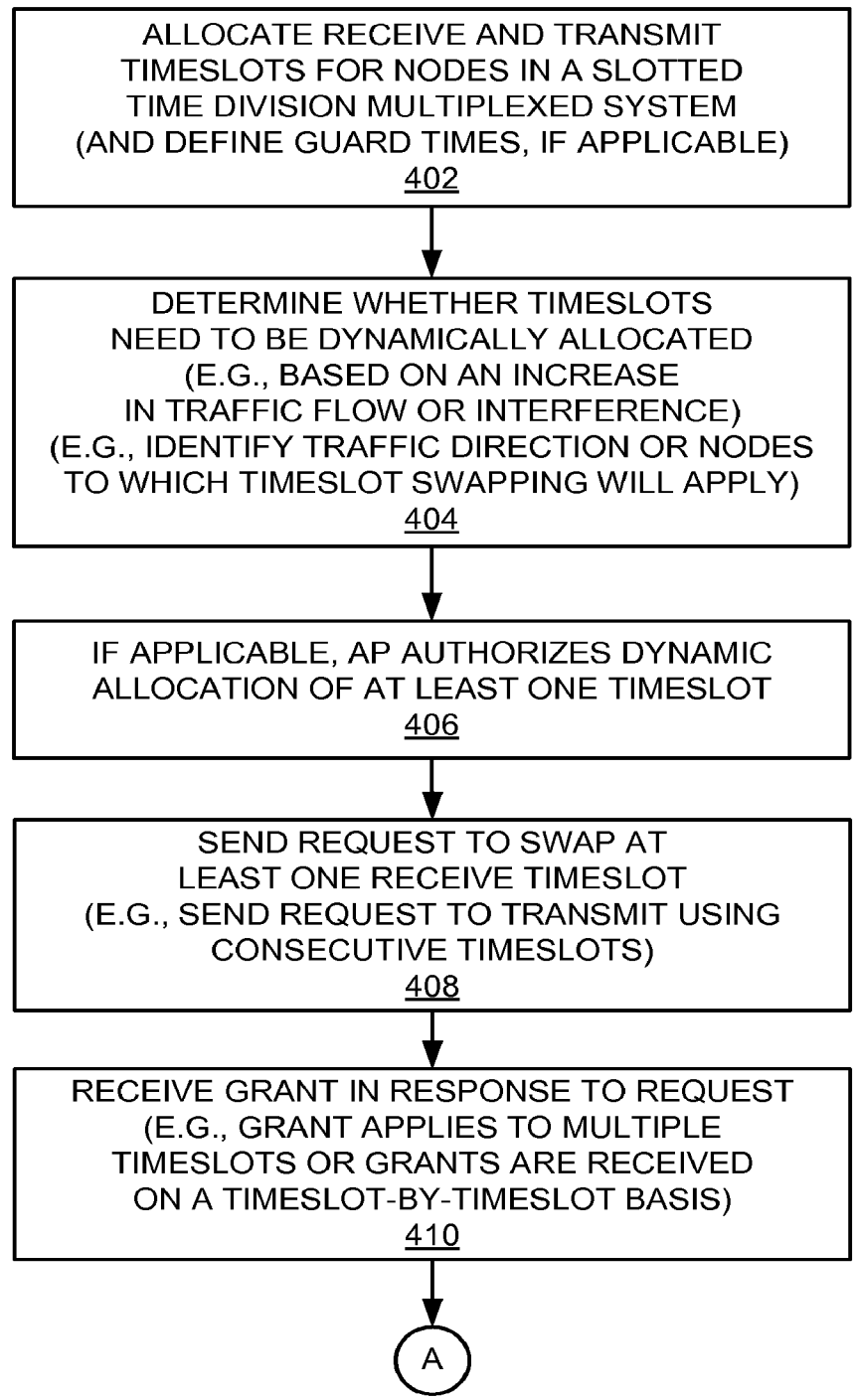
FIGS. 4A and 4B, is a flowchart of several sample aspects of operations that may be performed to designate the use of one or more timeslots.
Figure 4B:
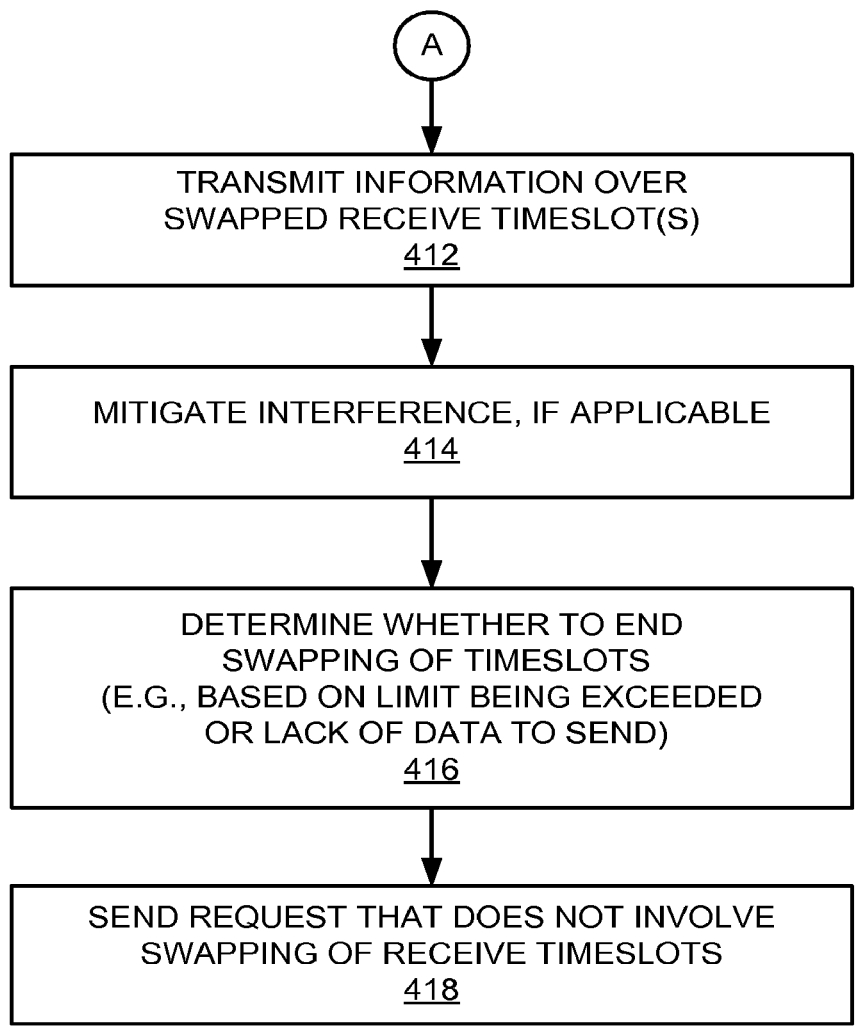
Figure 5:
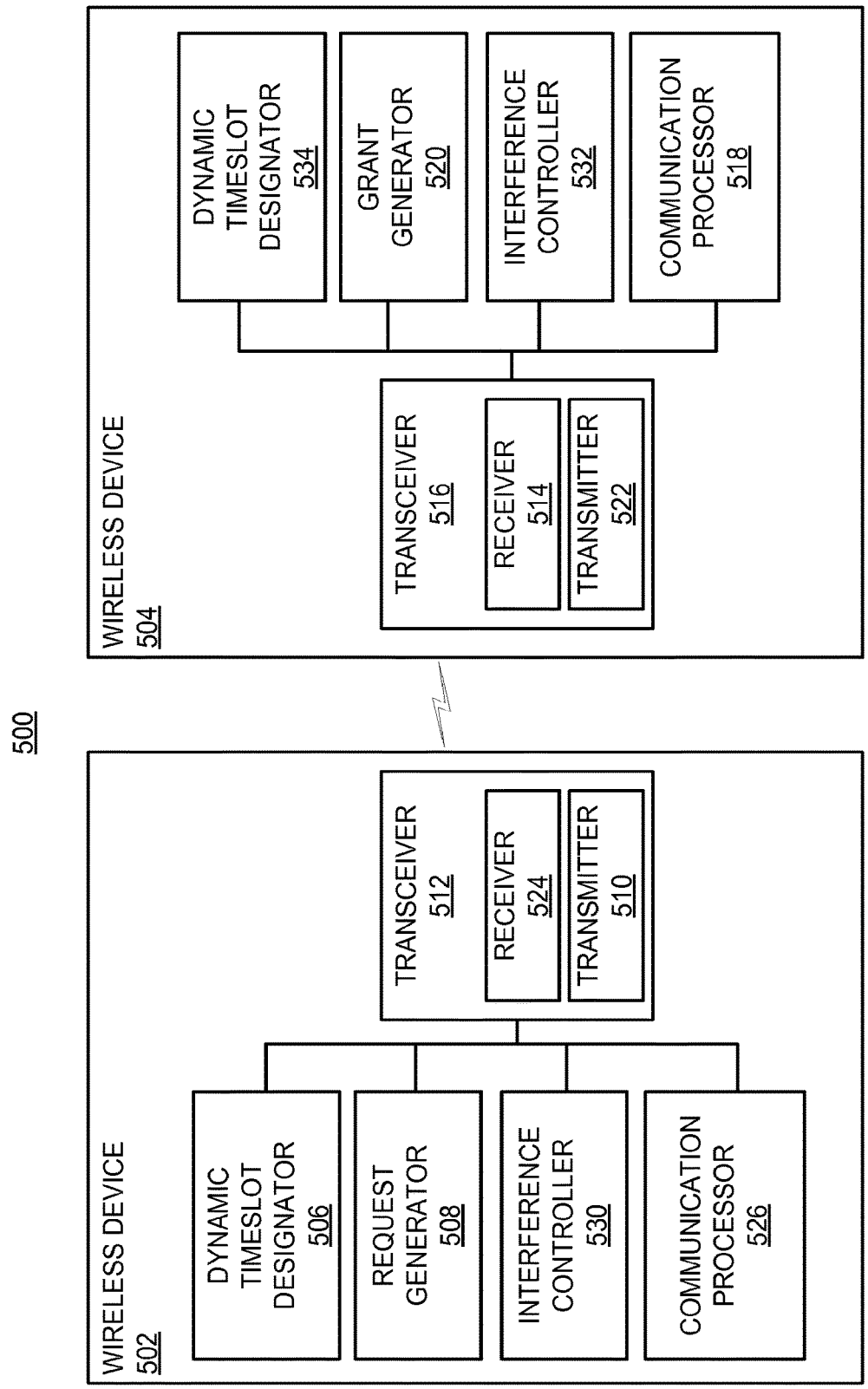
FIG. 5 is a simplified block diagram of several sample aspects of wireless devices adapted to designate the use of one or more timeslots.

Additional details relating to a timeslot swapping scheme will now be described in conjunction with FIGS. 4-9. FIG. 4 illustrates several sample operations that may be performed to swap timeslots. FIG. 5 illustrates several sample components that may be employed in wireless devices to facilitate timeslot swapping. FIGS. 6-9 are several timeslot timing diagrams that illustrate various aspects relating to sample timeslot swapping operations. It should be appreciated that the teachings herein are applicable to other examples and are not limited to the illustrated examples.

For convenience, the operations of FIG. 4 (or any other operations discussed or taught herein) may be described as being performed by specific components (e.g., components of the system 500 of FIG. 5). It should be appreciated, however, that these operations may be performed by other types of components and may be performed using a different number of components. It also should be appreciated that one or more of the operations described herein may not be employed in a given example.

As represented by block 402 of FIG. 4, at some point in time an initial designation (e.g., a default designation) of transmit and receive timeslots is provided for communication in a slotted time division multiplexed system. For example, the initial designation may be the result of a centralized planning scheme. Hence, the designation may be made before a given wireless device commences communication in the system. Alternatively, the initial designation may be made by a wireless device (e.g., an access point) that establishes communication in the system. For example, in the example of FIG. 5, a wireless device 502 (e.g., an access point) may include a dynamic timeslot designator 506 that defines the timeslots to be used by associated nodes (e.g., wireless devices) and defines the corresponding use of those timeslots.

Figure 6:
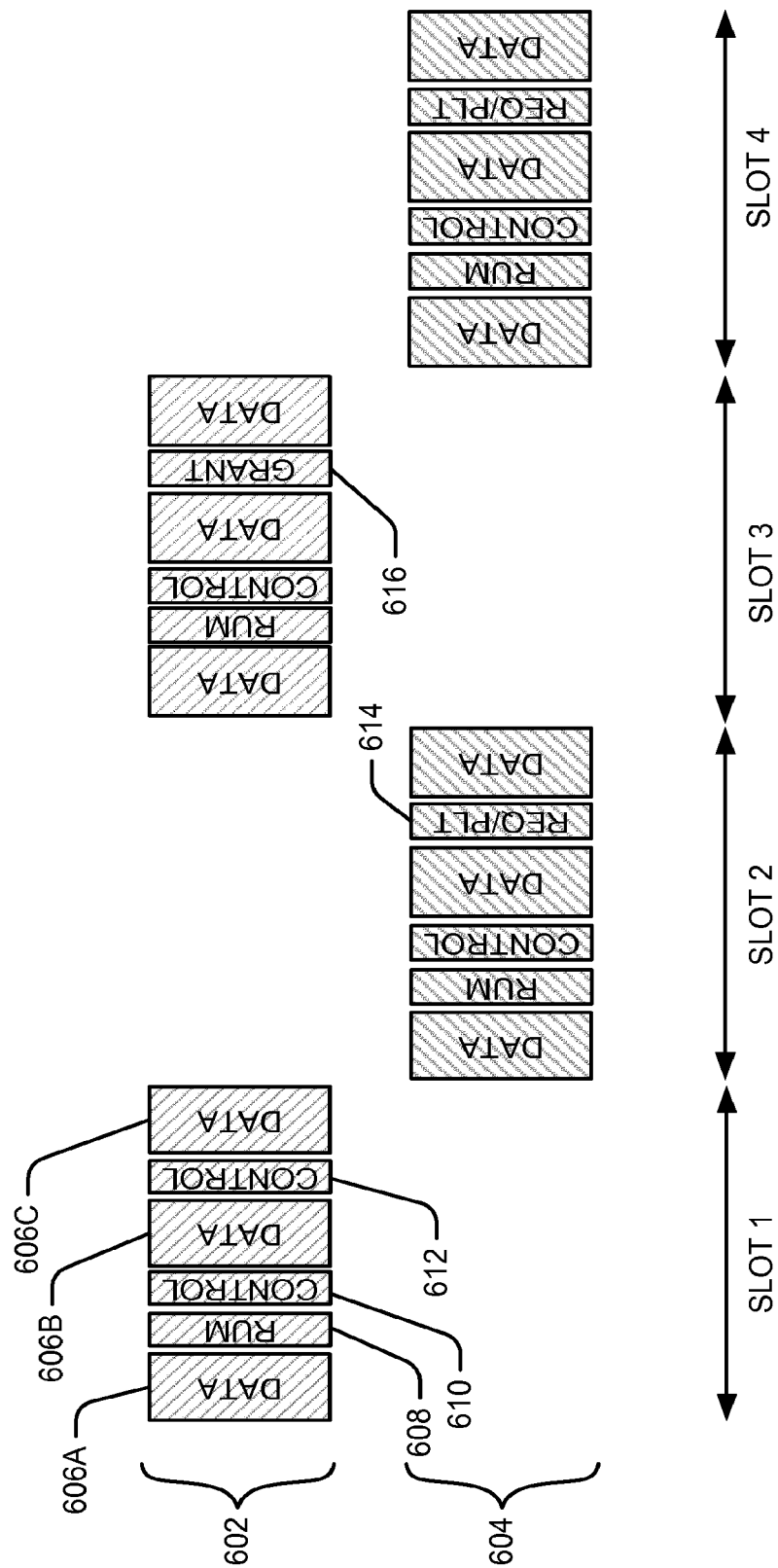
FIG. 6 is a simplified diagram of sample aspects of a timeslot structure.

FIG. 6 illustrates several aspects of a sample timeslot structure. As mentioned above, the timeslots for all of the nodes in a system may be synchronized. Here, a specific period of time may be designated within each timeslot for the transmission of control information. In this case, nodes that have data to transmit or that are expecting to receive data may transmit or listen for control information at the designated periods of time during a timeslot. Accordingly, in the example of FIG. 6, each of the timeslots includes data portions (e.g., portions 606A-606C) and control portions (e.g., portions 608, 610, and 612). It should be appreciated that the sizes of the portions in FIG. 6 are merely representative. In practice, the sizes of the data portions may be significantly larger that the sizes of the control portions.

The control portions may be used, for example, in a system that employs a request-grant timeslot transmission control scheme whereby each node may send a message to its associated receiving node to request to transmit during an upcoming timeslot. Referring to the system 500 of FIG. 5 and to FIG. 6, a brief example of such a scheme follows. The devices 502 and 504 may be associated with one another whereby the device 502 is initially configured to transmit during even numbered timeslots (e.g., timeslot set 604) while the device 504 is initially configured to transmit during odd numbered timeslots (e.g., timeslot set 602). In the event the device 502 wishes to send data to the device 504, the device 502 may listen to a control channel (e.g., a RUM 608 transmitted by device 504) during timeslot 1 to determine, for example, whether any other nodes are contending for timeslot 4. An example of such a contention scheme follows.

A contention scheme may be employed to mitigate any interference that wireless transmissions from a node in a network cause at a neighboring node. For example, referring again to FIG. 1, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power of the node 1020, transmissions from the node 1020 (as represented by a dashed symbol 106C) may interfere with reception at the node 104B.

To mitigate such interference, the nodes of a wireless communication system may employ an inter-node messaging scheme. For example, when reception at a node is being interfered with, the quality of service of the received data may decrease. In the event, the quality of service level at the node falls below a desired quality of service level the node may transmit a resource utilization message ("RUM"). In some aspects, a RUM may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a RUM may utilize the fact that it has received a RUM, as well as the weight thereof, to determine an appropriate response. For example, if a transmitting node determines that a non-associated receiving node is more disadvantaged than the receiving node associated with that transmitting node, the transmitting node may elect to abstain from transmitting or may reduce its transmit power during one or more designated timeslots to avoid interfering with the non-associated receiving node. Alternatively, in the event the transmitting node determines that its associated receiving node is more disadvantaged than any other receiving nodes that sent RUMs, the transmitting node may ignore the RUMs from the non-associated nodes. In this case, the transmitting node may elect to transmit during the associated timeslot.

The advertisement of the RUMs and associated weights may thus provide a collision avoidance scheme that is fair to all nodes in the system. Here, nodes that have data to transmit may scan for control indications at the designated period of time during a timeslot to determine whether any receiving nodes are requesting transmitting nodes to limit their transmissions. In some examples, this method of interference avoidance may be employed across a synchronous system. For example, any node in the synchronous system may monitor for control indications at the designated times to readily determine whether there are any associated or non-associated receiving nodes that are requesting the transmitting nodes to limit their transmissions.

Referring again to FIGS. 5 and 6, if the device 502 determines that it may transmit during timeslot 4, the device 502 sends a corresponding request ("REQ") to transmit via a control channel (e.g., control portion 614) during timeslot 2. For example, a request generator 508 of the device 502 may generate a request to transmit that is transmitted by a transmitter 510 of a transceiver 512. In accordance with the RUM-based scheme discussed above, other neighboring transmitting nodes may not send a request to transmit during timeslot 2 if their associated receiving nodes are less disadvantaged than the device 504.

A request may take various forms. For example, a request may include information regarding the timeslot during which data is to be transmitted (e.g., timeslot 4), information regarding the data that is to be sent (e.g., the type of data and quality of service expectations, transmission rate information, transmit power, and so on). In addition, a pilot signal ("PL T") may be transmitted in conjunction with a request. The pilot signal may be transmitted at a known power spectral density or power level. In this way, upon reception of the request and the pilot signal by the device 504 (e.g., via a receiver 514 of a transceiver 516), a communication processor 518 may determine appropriate transmission parameters for the data transmission during timeslot 4 (e.g., based on a carrier-to-interference ratio derived from the pilot). Such parameters may include, for example, data transmission rate, modulation, and coding. A grant generator 520 of the device 504 may thus generate a grant message including these parameters whereby a transmitter 522 transmits the grant message via a control channel (e.g., control portion 616) during timeslot 3.

Upon reception of the grant by a receiver 524 of the device 502, a communication processor 526 formats data according to the designated transmission parameters. The transmitter 510 then transmits the data during the data portions of timeslot 4. The device 504 may then acknowledge receipt of the data by sending an appropriate control message during timeslot 5, not shown (e.g., during a control portion corresponding to portion 612 shown in timeslot 1).

It should be appreciated that the above request-grant scheme may be implemented as a sliding cycle so that data may be transmitted during every transmit timeslot. For example, the device 502 may issue a request during timeslot 4 to transmit data during timeslot 6 (not shown), and so on. In a similar manner, for the reverse link, the device 504 may issue requests during timeslots 1 and 3 to transmit data during timeslots 3 and 5, respectively, and so on.

In accordance with the teachings herein, the basic operations described above may be used in conjunction with timeslot swapping. To maintain compatibility with these basic operations, several objectives may need to be met in conjunction with the swapping of timeslots. For example, when timeslots are swapped, appropriate measures may be taken to ensure that the interference mitigation (e.g., RUM-based) scheme is not compromised.

In addition, associated receiving nodes need to be informed of any timeslot swaps so that these nodes also modify their operations accordingly. That is, for the designated timeslots, the nodes should now be receiving instead of transmitting.

In addition, provisions may be taken to ensure that all of the affected nodes are informed of the duration (e.g., the number of timeslots) of the timeslot swapping. For example, a node may provide an indication as to the duration of a timeslot swap when the swap is initially requested (e.g., via a request message). In some cases timeslot swapping may be performed on a timeslot-by-timeslot basis. In some cases, a node may be allowed to switch timeslots on a continual basis, if needed.

Also, provisions may be made to enable a node to transmit during a timeslot that is otherwise designated as a receive timeslot and to receive during a timeslot that is otherwise designated as a transmit timeslot. For example, as will be discussed in more detail below, in conjunction with swapping a timeslot, a node may need to monitor for certain control messages (e.g., RUMs and grants) during a timeslot that is otherwise used for transmitting. In addition, a node may need to transmit certain control information (e.g., a pilot signal) during a timeslot that is otherwise used for receiving.

As indicated in FIG. 6, in some aspects guard times (i.e., guard time periods) may be defined adjacent to one or more of the control portions to accommodate switching between transmission and reception at one or more nodes during a given timeslot. In FIG. 6 these guard times are represented by, for example, the narrow spaces on either side of the control portions 608, 610, and 612.

The overhead otherwise associated with guard times may be avoided through the use of a symbol dropping scheme. For example, a communication processor of a node that is transmitting data during a timeslot may simply drop one or more symbols during the period of time otherwise associated with the guard time. In other words, the desired spacing in time between the different portions of a timeslot may be dynamically provided by dropping at least one symbol during this time period. Here, a communication processor of a node that receives the resulting data (e.g., the node the issued the grant message) may have previously defined (e.g., adjusted) the coding rate and/or the modulation for the transmission to accommodate the dropping of one or more symbols. It should be appreciated that symbols may be dropped only when there is switching between transmitting and receiving during a timeslot. Thus, when there is no switching between transmitting and receiving during a timeslot, normal coding rate and modulation may be used. Moreover, in that case, there are no guard times between the different portions of a timeslot.

Referring again to the operations of FIG. 4, as represented by block 404, at some point in time a node may determine whether one or more timeslots should be swapped. For example, in FIG. 5 the dynamic timeslot designator 506 may monitor various conditions over time to determine whether to designate a new use (e.g., transmitting or receiving) for at least one portion of a timeslot or several timeslots. Such a determination may be made based on one or more of various factors.

In some aspects a decision to swap timeslots is based on asymmetry between an amount of data waiting to be transmitted from a first node (e.g., device 502) to a second node (e.g., device 504) and an amount of data waiting to be transmitted from the second node to the first node. Thus, if the first node has more data to transmit than the second node, one or more of the second node's transmit timeslots may be redesignated as transmit timeslots for the first node.

The designation of such a new use may involve a variety of operations. For example, a node may transmit information to another node where the information relates to the amount of data waiting to be transmitted. Similarly, a designation of use may be based on the status of one or more buffers at the nodes. For example, a node (e.g., an access point) may monitor the status (e.g., empty, full, etc.) of one or more of its buffers and one or more buffers of its associated nodes to determine the amount of data queued at each node. Also, a designation of use may be based on the number (e.g., a decrease in the number) of received requests from associated nodes (e.g., a parent node and/or child nodes).

In some aspects, a designation of use may be based on the rate at which nodes may transmit and/or receive data. For example, a designation of use may be based on asymmetry between a rate at which a first node (e.g., device 502) transmits data to a second node (e.g., device 504) and a rate at which the second node transmits data to the first node. A designation of use also may be based on asymmetry between a rate at which a first node (e.g., device 502) may receive data from a second node (e.g., device 504) and a rate at which the second node may receive data from the first node. Similarly, a designation of use may be based on how quickly the nodes process data, the relative transmit powers of the nodes, or the antenna gains of the nodes. Moreover, a designation of use may be based on the number of links associated with the nodes. For example, an access point that is communicating with a large number of access terminals may transmit at a slower overall rate than the transmission rate provided by an access terminal that is communicating with that access point.

In some aspects, a designation of use may be based on interference associated with one or more nodes. For example, in the event a given node is subjected to interference that affects the reception of data at that node during certain timeslots, a prior designated use (e.g., a default designated use) of one or more timeslots may be changed (e.g., redesignated) to a new designated use in an attempt to limit the interfering transmissions. Conversely, a decision may be made to not make a given timeslot designation based on a determination that such a designation of use may cause interference at one or more nodes. To this end, the devices 502 and 504 may include respective interference controllers 530 and 532 that perform interference-related operations.

In some aspects, a designation of use may be a function of a quality of service requirement for traffic at each node. Thus, a designation of use may be based on desired latency, throughput or some other quality of service-related factor.

In some aspects, a designation of use may apply to only a subset of the links associated with a given node. For example, a node may designate a new use only for an uplink (e.g., if the downlink data flow is acceptable), only for a downlink (e.g., if the uplink data flow is acceptable), or for both an uplink and a downlink. In addition, a node (e.g., an access point) may designate a new use for timeslots that are only to be used for communication with a subset of a larger set of nodes that are associated with the access point. Here, the other nodes (i.e., not in the subset) may need to be aware of the timeslot swap since the access point may be transmitting and receiving on different timeslots than usual. Moreover, the request to swap may indicate to which nodes the timeslot swap applies.

As represented by block 406 of FIG. 4, an access point may authorize dynamic designation of at least one portion of a timeslot. For example, in some cases an access point may make the determination as to whether timeslots need to be swapped. Once the access point makes this determination, it may simply proceed with determination as to whether timeslots need to be swapped. In these cases, the other node may be required to obtain authorization from the access point before initiating such a swap. Sample operations relating to the latter cases are discussed in more detail below in conjunction with FIG. 9.

Blocks 408-420 represent operations that may be performed to accomplish a timeslot swap. Initially, an example of these operations will be described in conjunction with FIGS. 7 and 8 for a scenario where an access point (e.g., device 502) initiates the timeslot swap. Another example of these operations will then be described in conjunction with FIG. 9 for a scenario where an access terminal (e.g., device 504) initiates the timeslot swap.

Figure 7:
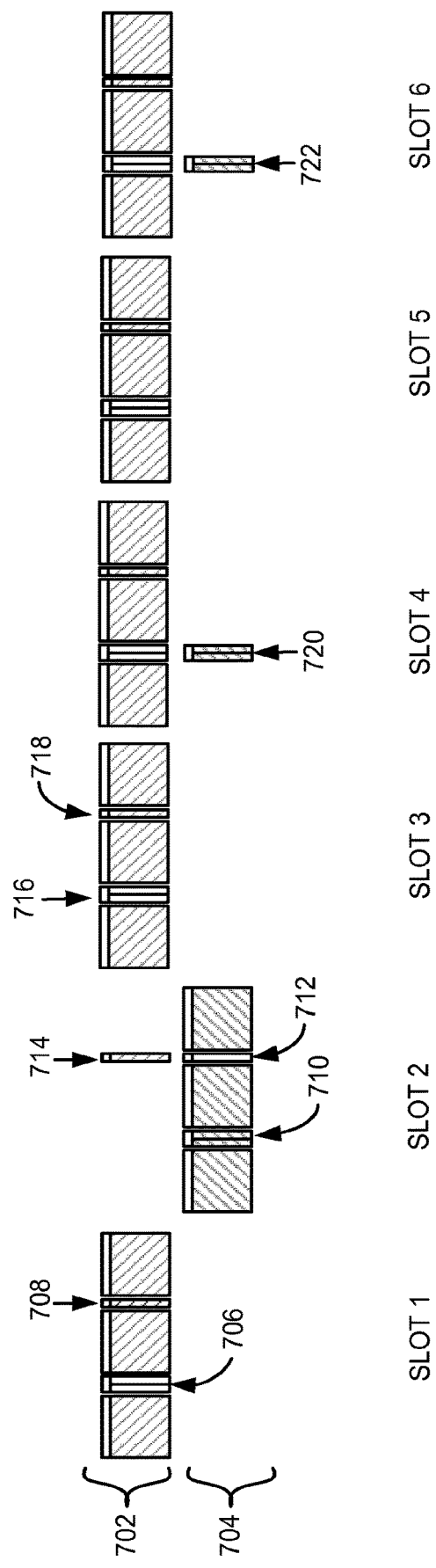
FIGS. 7, 8, and 9, are simplified diagrams of several sample aspects of timeslot usage.

In the example of FIG. 7, the access point is originally configured to transmit during odd numbered timeslots (e.g., timeslot set 702). Thus, an associated node (e.g., an access terminal) may be configured to transmit during even numbered timeslots (e.g., timeslot set 704). As mentioned above, the access point may monitor for RUM messages at the appropriate time to determine whether it should initiate a request to transmit during a given timeslot. For example, in the event the access point wishes to swap timeslot 4 from a receive timeslot (with respect to the access point) to a transmit timeslot, the access point may listen for RUMs during the control portion 706 of timeslot 1. In some aspects, this monitoring operation involves a designation of a new use for a portion of a timeslot. For example, in a non-swapped mode of operation the access point may have used the control portion 706 of timeslot 1 to transmit a RUM message to facilitate reception of data by the access point during timeslot 4.

Here, it should be appreciated that the access point is now monitoring information during a portion of one of its transmit timeslots. To this end, the timeslots may be defined with guard times before and/or after the control portions to facilitate the access point switching from a transmit mode of operation to a receive mode of operation and vice versa. In FIG. 7, these guard times are represented by the narrow spaces between the control portion 706 and adjacent data portions (e.g., the adjacent shaded portions).

At block 408, depending on the results of the analysis of the RUMs received during the control portion 706, the access point may transmit a request message (e.g., via control portion 708) to initiate a swap of one or more timeslots (e.g., to enable transmission during consecutive timeslots). For example, the request message may include a request to transmit during timeslot 3 (the access point's normal transmit timeslot) as well as during timeslot 4 (a timeslot to be swapped). Thus, in this case, the request message includes an inherent timeslot swap request. In contrast, in other cases the access point may inform an associated node of a timeslot swap by initially sending a dedicated message (e.g., a request to swap).

The access point may transmit other control information during control portion 708. For example, the access point may transmit a grant in response to a request by the associated node to transmit during timeslot 2. In addition, the access point may transmit an acknowledgement in response to data received from the associated node during timeslot 0 (not shown).

After receiving the request from the access point during timeslot 1, the associated node may transmit a grant for timeslot 3 or for timeslots 3 and 4 via control portion 710 of timeslot 2. That is, the associated node may issue a collective grant for multiple timeslots or may issue grants on a timeslot-by-timeslot basis (e.g., when the requests are made on a similar basis). In either case, the access point receives this grant since the access point is receiving during this portion of timeslot 2 (block 410).

The associated node also may transmit a RUM for timeslot 5 during the control portion 710 (e.g., during a first part of the portion 710). Thus, in conjunction with the swapping of timeslot 5, the associated node may alter its operation so that it performs all of the normal functions associated with receive operations during timeslots that were formerly designated as transmit timeslots for that node.

As represented by FIG. 7, the associated node will not transmit a request and associated pilot for timeslot 4 during control portion 712 of timeslot 2. Instead, the access point may transmit a pilot during this period of time as indicated by the transmitted signal 714. Here, it should be appreciated that the access point is now transmitting during a receive timeslot (timeslot 2). Thus, in some aspects this involves a designation of a new use for a portion of a timeslot. In addition, guard times may be provided adjacent the control portion 712 in the timeslot structure to facilitate the access point switching from a receive mode to a transmit mode and vice versa.

At block 412, the access point may then transmit data during the requested timeslots, including any swapped timeslots. Thus, as shown in FIG. 7, the access point transmits during the data portions of timeslots 3 and 4. Here, it should be appreciated that in some aspects the timeslot swapping may designate a use only for some or for all of the data portions of a given timeslot.

The nodes may then continue to provide appropriate signaling to support the swapping of timeslots for as long as the swapping is needed or allowed. For example, during control portion 716 of timeslot 3 the access point may listen for RUMs associated with contention for timeslot 6. The access point may then send a request to transmit and an associated pilot during timeslots 5 and 6 via control portion 718. At control portion 720 of timeslot 4, the associated node may acknowledge receipt of the data for timeslot 3 and issue a grant of the request for timeslots 5 and 6. Thus, the timeslot swapping is allowed to continue. For example, the associated node may transmit a RUM for timeslot 7 during control portion 720. In addition, at control portion 722 of timeslot 6, the associated node may acknowledge receipt of the data for timeslots 4 and 5, issue a grant in response to a request to transmit during timeslots 7 and 8, and transmit a RUM for timeslot 9.

As represented by block 414 of FIG. 4, the access point may base a decision to perform or continue timeslot swapping on whether the timeslot swapping causes or may cause undue interference in the system. For example, referring again to FIG. 2, in the event a timeslot swap by node 222 results in undue interference at node 206 (e.g., as indicated by an increase in the number and/or weights of RUMs transmitted by node 206), the node 222 may elect to refrain from timeslot swapping or may modify how it performs its timeslot swapping.

As represented by block 416, at some point in time the access point may determine whether it should terminate its timeslot swapping. This decision may be based on various criteria. For example, in some cases the access point may terminate timeslot swapping when it no longer has any data to send or when there is no longer asymmetry between the amounts of data waiting to be transmitted by each node. In addition, in some cases the system may only allow a certain number of consecutive timeslot swaps or a certain number of timeslot swaps over a given period of time. Thus, the access point may terminate timeslot swapping once the designated number of timeslots has been swapped. In some cases, timeslot swapping may be terminated when the node that requested the swap has determined (e.g., based on a received RUM having higher priority) that another node needs to transmit during a timeslot that would otherwise be swapped.

Figure 8:
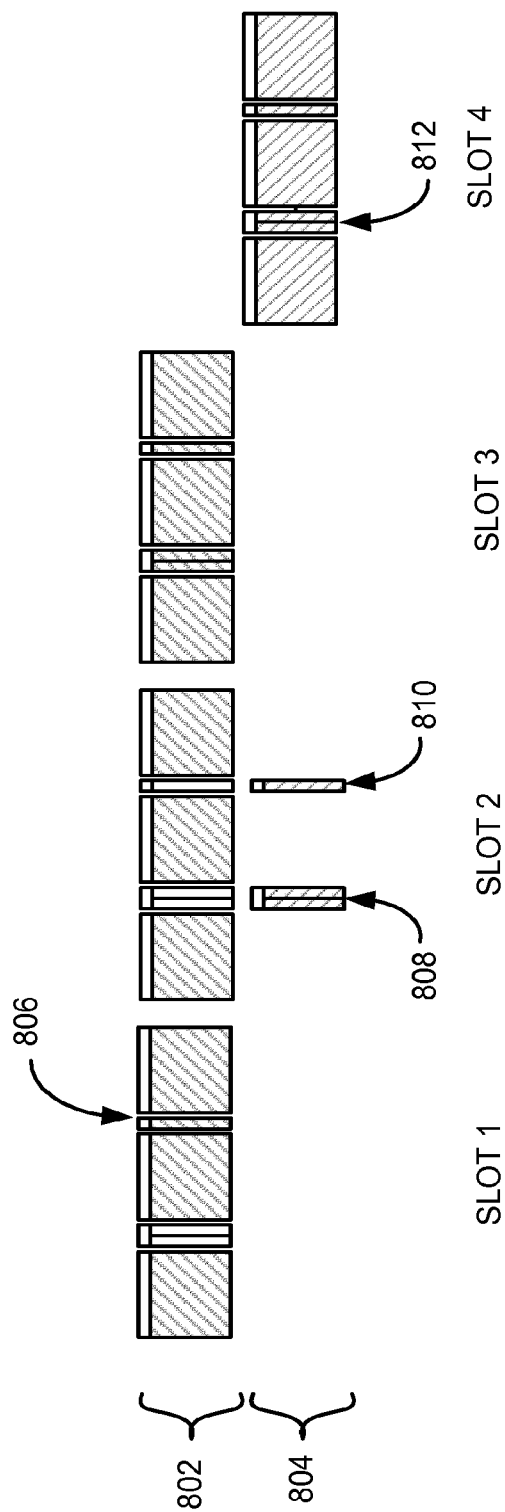

FIG. 8 depicts several timeslots associated with exiting color swapping. Here, the timeslot set 802 may correspond to later occurring timeslots of the timeslot set 702 of FIG. 7, while the timeslot set 804 may correspond to later occurring timeslots of the timeslot set 704 of FIG. 7. For convenience, FIG. 8 also refers to timeslots 1-4. It should be appreciated that the use of similar timeslot numbering herein is not intended to indicate that such timeslot numbering are referring to the same points in time.

As represented by block 418 and as shown in FIG. 8, in some aspects timeslot swapping may be terminated by sending a request that does not involve a timeslot swap. For example, the request at control portion 806 may simply be a request to transmit during timeslot 3. Thus, at control portion 808, the associated node may transmit a grant for transmitting during timeslot 3, a RUM associated with timeslot 5, and an acknowledgement of the data received during timeslots 0 and 1. In addition, the associated node may then transmit a request and associated pilot at control portion 810 so that the associated node may transmit during timeslot 4. Hence, operations under the original timeslot designation recommence after the associated node transmits its acknowledgement at control portion 812 of timeslot 4 in response to the data the associated node received during swapped timeslot 2.

Figure 9:
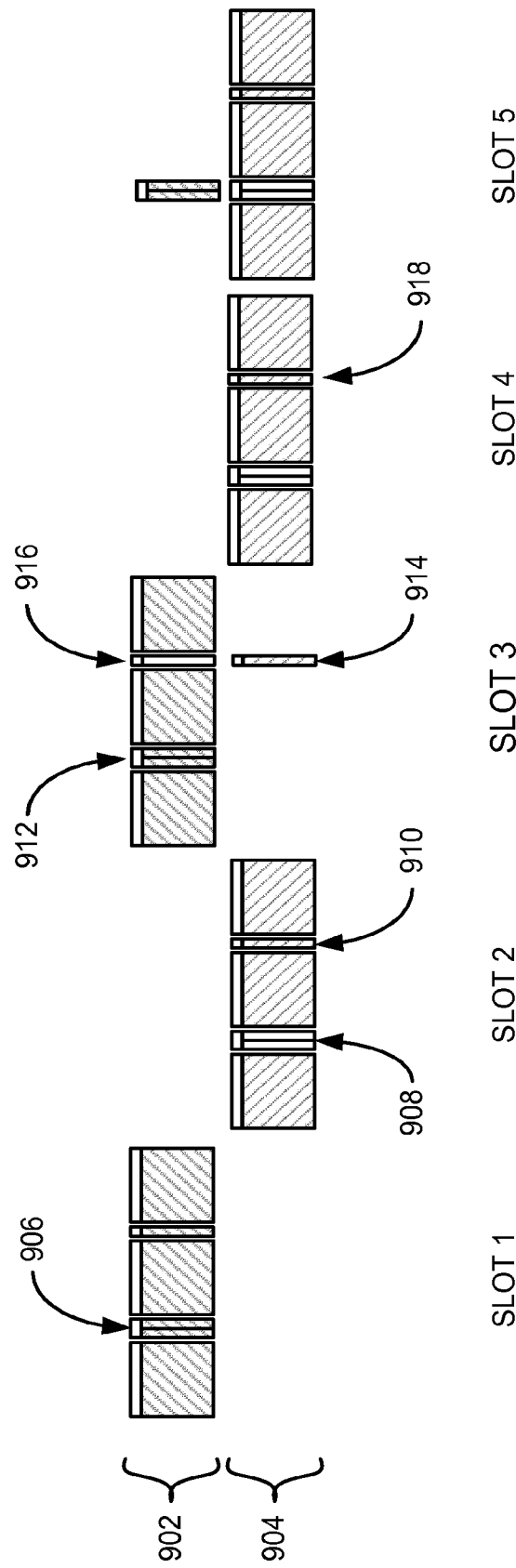

Referring now to FIG. 9, in some aspect timeslot swapping may be invoked by an access terminal. As mentioned above, an associated access point may be required to first authorize such timeslot swapping. For example, an access point associated with transmit timeslot set 902 (e.g., normally utilizing odd transmit timeslots) may transmit a message during control portion 906 indicating that the access terminal may swap timeslot 5. Accordingly, in this case, a node (e.g., the access point) that receives data via a swapped timeslot may be the node that authorized the timeslot swapping operation.

In response to this authorization message, an access terminal associated with transmit timeslot set 904 (e.g., normally utilizing the even transmit timeslots) monitors RUMs during a control portion 908 of timeslot 2 and sends a request during control portion 910 to transmit during timeslot 4 and 5. In accordance with normal operations, the access terminal also may transmit a grant for timeslot 3 and an acknowledgement for timeslot 1 during control portion 910.

During control portion 912, the access point may transmit a grant for timeslots 4 and 5, an acknowledgement for timeslot 2, and a RUM for timeslot 6. In this way, the access point may indicate that the timeslot swap has been accepted.

In a similar manner as discussed above, if the swap was accepted, the access point will not transmit a request for timeslot 5 and an associated pilot during the control portion 916. Instead, the access terminal will transmit a pilot during this time period as indicated by the signal 914. Again, it should be appreciated that the access terminal may be transmitting during receive timeslots and receiving during transmit timeslots in conjunction with these timeslot swapping operations.

The timeslot swapping may then continue as needed or until it is terminated for some other reason. Thus, during control portion 918 of timeslot 4, the access terminal may send a request to transmit during timeslots 6 and 7. The timeslots operations may be terminated in a similar manner as discussed above (e.g., by not sending request with a timeslot swap).

It should be appreciated that timeslot swapping may be accomplished in various ways in accordance with the teachings herein. For example, a node may issue requests to swap timeslots on a timeslot-by-timeslot basis. In this case, an associated node may issue its corresponding grants on a timeslot-by-timeslot basis. One potential advantage of such an approach is that the grants may be based on more accurate carrier-to-interference estimates since these estimates may be based on a pilot that was received in the immediately preceding timeslot. In contrast, in schemes where grants and/or requests for multiple timeslots are grouped together, the grants may be based on carrier-to-interference estimates that are, in turn, based on a pilot signal that was transmitted two or more timeslots earlier in time.

In some aspects, the designation of use may be performed by each of a set of associated nodes. For example, whenever a given node (e.g., an access point) has data to be transmitted, the node may designate one or more timeslots for the transmission. Conversely, when another node (e.g., an access terminal) has data to be transmitted, that node may designate one or more timeslots for its transmission. Here, the nodes may employ an appropriate messaging scheme (e.g., via known control channels) to enable one node to inform other nodes of the designated use.

In some aspects, all of timeslot designations may be made in this manner. In other words, an initial designation of transmit and receive timeslots may not be made in a system. Rather, these designations may be made by the nodes in the system whenever they have data to transmit. Thus, the node that designates the use of the timeslots may change every timeslot, every few timeslots, or in some other manner.

From the above, it should be appreciated that a designation of use may be provided in a variety of ways. As discussed above, in some aspects a designation of use involves an access point determining which timeslots are to be swapped and transmitting one or more messages to its associated nodes to inform those nodes of the timeslot swap. Moreover, as mentioned above, the impetus for invoking a timeslot swap may derive from another node (e.g., an access terminal). Here, in some aspects a designation of use may involve one or more of: generating information relating to designating a new use; the transmission of messages including such information from one node to another; and the processing of such information by a node that receives these messages.

In some cases an access terminal may provide information to the access point that the access point uses to determine whether to swap timeslots. For example, a designation of use may involve a second node (e.g., an access terminal) sending a message to a first node (e.g., an access point) where the message indicates the amount of data queued for transmission to the first node, the buffer status of the second node, or a transmission rate and/or a reception rate of the second node, latency information associated with the second node, or quality of service information associated with the second node.

In addition, m some cases, an access terminal may send a message to an access point requesting a timeslot swap. For example, an access terminal (e.g., dynamic timeslot designator 534 of FIG. 5) may send a message indicating that a swap is desired. Such a message also may indicate a number of timeslots to swap. In some aspects the criteria used by the access terminal in determining whether to swap a timeslot may be similar to the criteria described above (e.g., at block 404). In response to this message, the access point itself may designate the timeslots to be swapped or the access point may authorize the access terminal to designate the timeslots to be swapped. In addition, the access point may transmit a message to the access terminal indicating whether the request was granted or denied. In these cases, a designation of use may thus involve a second node (e.g., an access terminal) sending a request to swap to a first node (e.g., an access point). Moreover, a designation of use also may involve receiving such a request and operating on that request.

Figure 10:
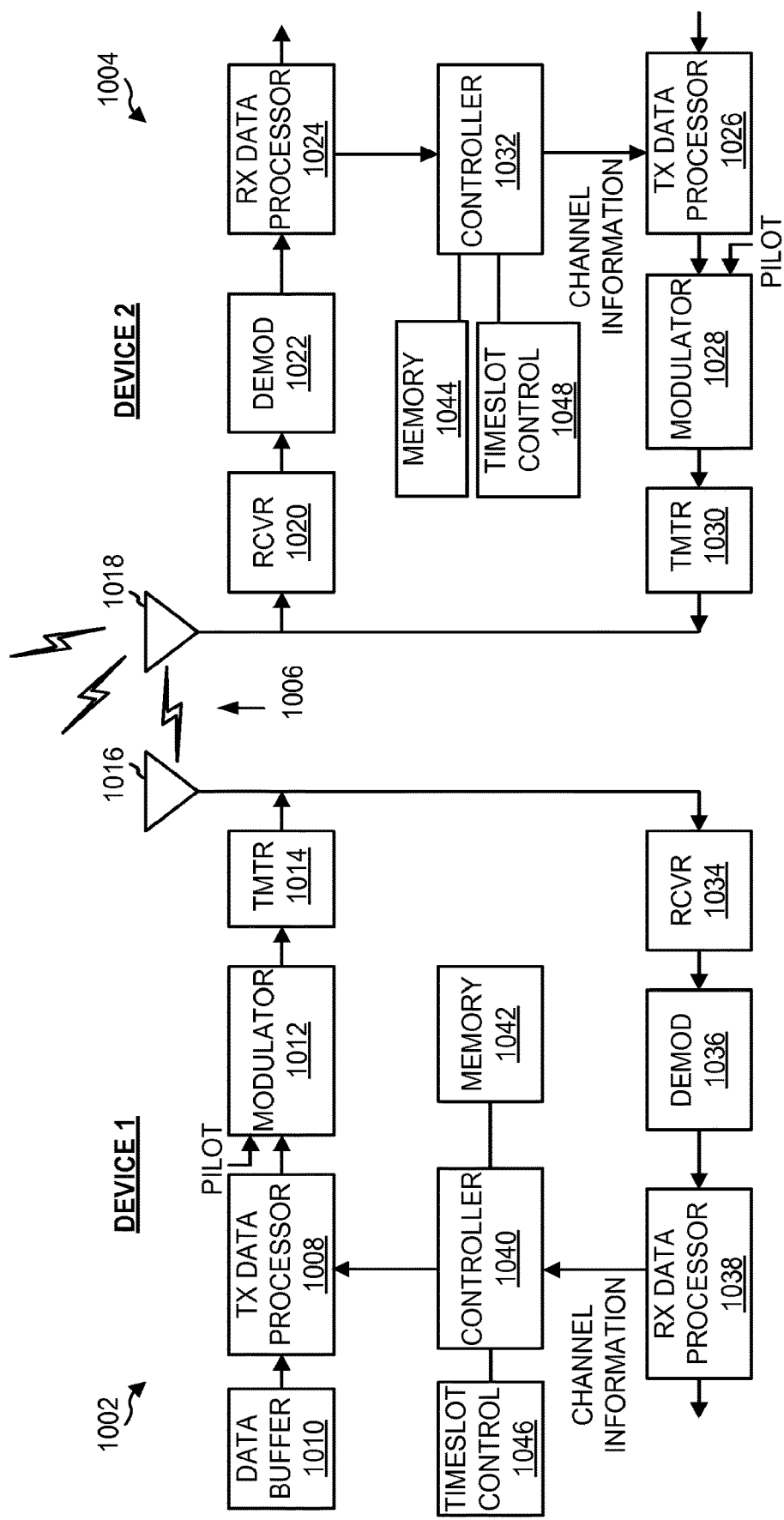
FIG. 10 is a simplified block diagram of several sample aspects of communication components.

The teachings herein may be incorporated into a device employing various components for communicating with at least one other wireless device. FIG. 10 depicts several sample components that may be employed to facilitate communication between devices. Here, a first device 1002 (e.g., an access terminal) and a second device 1004 (e.g., an access point) are adapted to communicate via a wireless communication link 1006 over a suitable medium.

Initially, components involved in sending information from the device 1002 to the device 1004 (e.g., a reverse link) will be treated. A transmit ("TX") data processor 1008 receives traffic data (e.g., data packets) from a data buffer 1010 or some other suitable component. The transmit data processor 1008 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1012 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1014 processes (e.g., converts to analog, filters, amplifies, and frequency upconverts) the output chip stream and generates a modulated signal, which is then transmitted from an antenna 1016.

The modulated signals transmitted by the device 1002 (along with signals from other devices in communication with the device 1004) are received by an antenna 1018 of the device 1004. A receiver ("RCVR") 1020 processes (e.g., conditions and digitizes) the received signal from the antenna 1018 and provides received samples. A demodulator ("DEMOD") 1022 processes (e.g., demodulates and detects) the received samples and provides detected data symbols, which may be a noisy estimate of the data symbols transmitted to the device 1004 by the other device(s). A receive ("RX") data processor 1024 processes (e.g., symbol demaps, deinterleaves, and decodes) the detected data symbols and provides decoded data associated with each transmitting device (e.g., device 1002).

Components involved in sending information from the device 1004 to the device 1002 (e.g., a forward link) will be now be treated. At the device 1004, traffic data is processed by a transmit ("TX") data processor 1026 to generate data symbols. A modulator 1028 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1030 and transmitted from the antenna 1018. Signaling for the forward link may include power control commands and other information (e.g., relating to a communication channel) generated by a controller 1032 for all devices (e.g. terminals) transmitting on the reverse link to the device 1004.

At the device 1002, the modulated signal transmitted by the device 1004 is received by the antenna 1016, conditioned and digitized by a receiver ("RCVR") 1034, and processed by a demodulator ("DEMOD") 1036 to obtain detected data symbols. A receive ("RX") data processor 1038 processes the detected data symbols and provides decoded data for the device 1002 and the forward link signaling. A controller 1040 receives power control commands and other information to control data transmission and to control transmit power on the reverse link to the device 1004.

The controllers 1040 and 1032 direct various operations of the device 1002 and the device 1004, respectively. For example, a controller may determine an appropriate filter, reporting information about the filter, and decode information using a filter. Data memories 1042 and 1044 may store program codes and data used by the controllers 1040 and 1032, respectively.

FIG. 10 also illustrates that the communication components may include one or more components that perform timeslot designation operations as taught herein. For example, a timeslot control component 1046 may cooperate with the controller 1040 and/or other components of the device 1002 to send and receive signals to another device (e.g., device 1004) as taught herein. Similarly, a timeslot control component 1048 may cooperate with the controller 1032 and/or other components of the device 1004 to send and receive signals to another device (e.g., device 1002).

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. An access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., messages including control, data, or both). An access point also may include a traffic manager configured to manage data traffic flows that its receiver receives from a plurality of wireless nodes or that its transmitter transmits to a plurality of wireless nodes. In addition, an access terminal may include a user interface adapted to output an indication based on received data.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 510 and 522 and receivers 514 and 524) that may include various components (e.g., signal generators and signal processors) that facilitate communication over a wireless medium.

Figure 11:
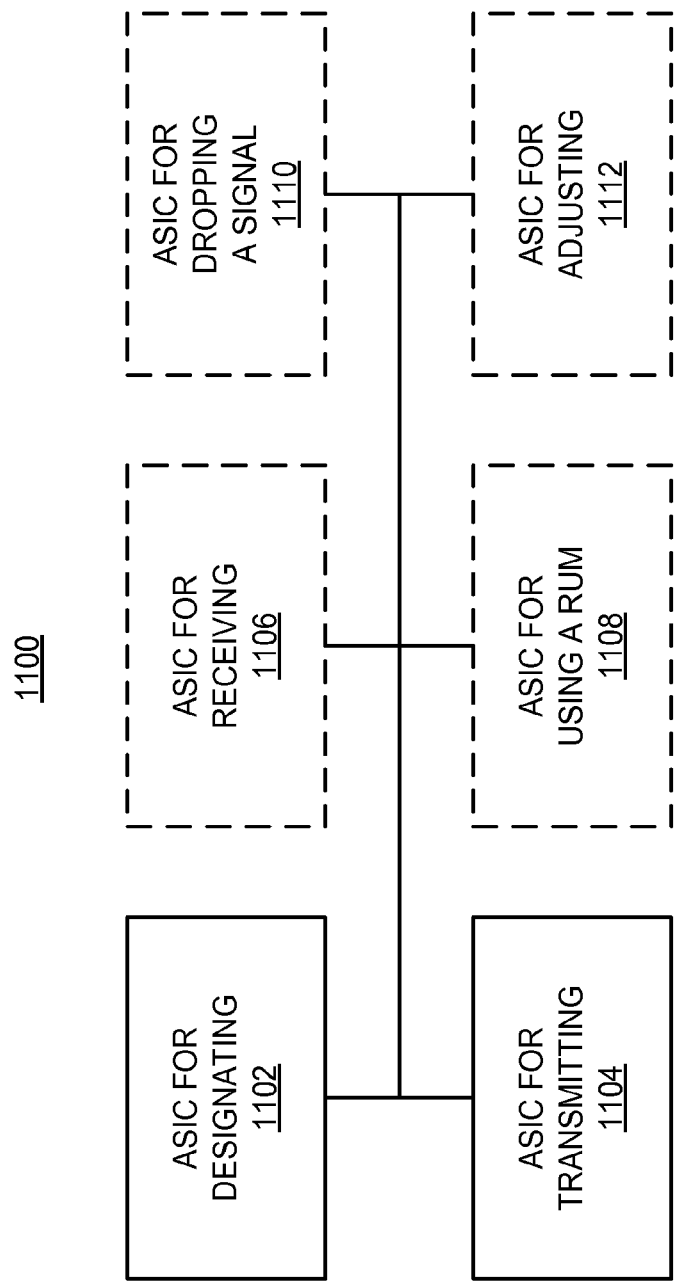
FIG. 11 is a simplified block diagram of several sample aspects of an apparatus configured to designate timeslot usage as taught herein.

The components described herein may be implemented in a variety of ways. Referring to FIG. 11, an apparatus 1100 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatus 1100 may include one or more modules that may perform one or more of the functions described above with regard to various figures. For example, an ASIC for designating 1102 may correspond to, for example, a timeslot designator as discussed herein. An ASIC for transmitting 1104 may correspond to, for example, a transmitter as discussed herein. An ASIC for receiving 1106 may correspond to, for example, a receiver as discussed herein. An ASIC for using a RUM 1108 may correspond to, for example, an interference controller as discussed herein. An ASIC for dropping a symbol 1110 may correspond to, for example, a communication processor as discussed herein. An ASIC for adjusting 1112 may correspond to, for example, a communication processor as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 1100 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 11 as well as other components and functions described herein, may be implemented using any suitable means. Such means also may be implemented, at least in part, using corresponding structure as taught herein. For example, the components described above in conjunction with the "ASIC for" components of FIG. 11 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
dynamically designating, by a first node, a use for a first portion of a timeslot that comprises the first portion and a second portion, wherein the dynamically designated use comprises transmitting to a second node or receiving from the second node; and
transmitting a message, to the second node, selected from a set of messages based at least in part on designating the use for the first portion of the timeslot, wherein the set of messages comprises:
a first message indicating a change of the first portion of the timeslot from a first prior designated use of receiving from the second node to a first new designated use of transmitting to the second node; and
a second message indicating a change of the first portion of the timeslot from a second prior designated use of transmitting to the second node to a second new designated use of receiving from the second node;
wherein the dynamically designated use is a function of interference associated with the first prior designated use or the second prior designated use.

2. The method of claim 1, wherein designating the use is based at least in part on:
interference associated with the first node or the second node;
an amount of traffic to be transmitted between the first node and the second node or as a function of at least one transmission rate; or
a reception rate associated with the first node or the second node.

3. The method of claim 1, further comprising:
receiving a third message from the second node indicating a designated use for at least one portion of a second timeslot, wherein designating the use of the first portion of the timeslot is based at least in part on receiving the third message.

4. The method of claim 1, further comprising:
receiving a third message from the second node; and
determining how to designate the use for the first portion of the timeslot based at least in part on the third message.

5. The method of claim 1, wherein the first node comprises an access terminal and the second node comprises an access point, the method further comprising:
generating information relating to designating one or more timeslots for transmitting to or receiving from the access point, wherein the message comprises a request to the access point to designate the one or more timeslots for transmitting or receiving based at least in part on the information, wherein designating the use is based at least in part on generating the information.

6. The method of claim 1, wherein the message indicates a designated use for at least one portion of each of a plurality of timeslots and a duration of the designated use.

7. The method of claim 1, wherein the first portion of the timeslot comprises a first data portion and a second data portion of the timeslot, and the method further comprises:
changing, for the first data portion of the timeslot, a prior designated use to a new designated use, and not changing, for the second data portion of the timeslot, a prior designated use.

8. The method of claim 1, wherein the designated use is designated based at least in part on an asymmetry between a first amount of information to be transmitted from the first node to the second node and a second amount of information to be transmitted from the second node to the first node.

9. The method of claim 1, wherein the designated use is designated based at least in part on an asymmetry between a first rate at which the first node transmits to the second node and a second rate at which the second node transmits to the first node.

10. The method of claim 1, further comprising:
counteracting interference resulting from the designated use by using a resource utilization message; or
preventing a change from a default designated use by using the resource utilization message.

11. The method of claim 1, wherein the first portion of the timeslot designated for use comprises a data portion and the second portion of the timeslot comprises a control portion.

12. The method of claim 1, further comprising:
defining a guard time period adjacent to the first portion of the timeslot to accommodate switching, at the first node or the second node, between transmission and reception during the timeslot, wherein designating the use is based at least in part on defining the guard time period.

13. The method of claim 1, further comprising:
dropping at least one symbol at a beginning, at an end, or at a beginning and an end of the first portion of the timeslot, wherein dropping the at least one symbol accommodates switching, at the first node or the second node, between transmission and reception during the timeslot.

14. The method of claim 1, further comprising:
defining a coding rate or a modulation scheme to accommodate dropping at least one symbol at a beginning, at an end, or at a beginning and an end of the first portion of the timeslot, wherein dropping the at least one symbol accommodates switching, at the first node or the second node, between transmission and reception during the timeslot.

15. An apparatus for wireless communication, comprising:
a processor;
memory coupled with the processor; and
the processor and the memory configured to:
dynamically designate, by a first node, a use for a first portion of a timeslot that comprises the first portion and a second portion, wherein the dynamically designated use comprises transmitting to a second node or receiving from the second node; and
transmit a message, to the second node, selected from a set of messages based at least in part on designating the use for the first portion of the timeslot, wherein the set of messages comprises:

a first message indicating a change of the first portion of the timeslot from a first prior designated use of receiving from the second node to a first new designated use of transmitting to the second node; and a second message indicating a change of the first portion of the timeslot from a second prior designated use of transmitting to the second node to a second new designated use of receiving from the second node; wherein the dynamically designated use is a function of interference associated with the first prior designated use or the second prior designated use.

16. The apparatus of claim 15, wherein designating the use is based at least in part on:

interference associated with the first node or the second node;

an amount of traffic to be transmitted between the first node and the second node or as a function of at least one transmission rate; or a reception rate associated with the first node or the second node.

17. The apparatus of claim 15, wherein the processor and the memory are further configured to:

receive a third message from the second node indicating a designated use for at least one portion of a second timeslot, wherein designating the use of the first portion of the timeslot is based at least in part on receiving the third message.

18. The apparatus of claim 15, wherein the processor and the memory are further configured to:

receive a third message from the second node; and determine how to designate the use for the first portion of the timeslot based at least in part on the third message.

19. The apparatus of claim 15, wherein the message indicates a designated use for at least one portion of a plurality of timeslots and a duration of the designated use.

20. An apparatus for wireless communication, comprising:

means for dynamically designating, at a first node, a use for a first portion of a timeslot that comprises the first portion and a second portion, wherein the dynamically designated use comprises transmitting to a second node or receiving from the second node; and means for transmitting a message, to the second node, selected from a set of messages based at least in part on designating the use for the first portion of the timeslot, wherein the set of messages comprises:

a first message indicating a change of the first portion of the timeslot from a first prior designated use of receiving from the second node to a first new designated use of transmitting to the second node; or a second message indicating a change of the first portion of the timeslot from a second prior designated use of transmitting to the second node to a second new designated use of receiving from the second node;

wherein the dynamically designated use is designated as a function of interference associated with the first prior designated use or the second prior designated use.

* * * * *